(12) United States Patent
Cobb et al.

(10) Patent No.: US 7,573,254 B2
(45) Date of Patent: Aug. 11, 2009

(54) SYSTEMS AND METHODS OF IDENTIFYING PATCH CORD CONNECTIONS IN A COMMUNICATIONS PATCHING SYSTEM USING COMMON MODE TRANSMISSION

(75) Inventors: Terry R. Cobb, Plano, TX (US); Bob Conte, Manalapan, NJ (US)

(73) Assignee: CommScope Inc. of North Carolina, Hickory, NC (US)

( * ) Notice: Subject to any disclaimer, the term of this patent is extended or adjusted under 35 U.S.C. 154(b) by 300 days.

(21) Appl. No.: 11/786,516

(22) Filed: Apr. 12, 2007

(65) Prior Publication Data
US 2008/0253556 A1    Oct. 16, 2008

(51) Int. Cl.
*G01R 19/00* (2006.01)

(52) U.S. Cl. ............................................ 324/66; 379/25

(58) Field of Classification Search ...................... 324/66
See application file for complete search history.

(56) References Cited

U.S. PATENT DOCUMENTS

| | | | |
|---|---|---|---|
| 5,483,467 | A | 1/1996 | Krupka et al. |
| 6,218,930 | B1 | 4/2001 | Katzenberg et al. |
| 6,350,148 | B1 * | 2/2002 | Bartolutti et al. ............. 439/489 |
| 6,985,713 | B2 | 1/2006 | Lehr et al. |
| 7,046,983 | B2 | 5/2006 | Elkayam et al. |
| 7,193,422 | B2 | 3/2007 | Velleca et al. |
| 2004/0021452 | A1 * | 2/2004 | Hwang et al. ................. 324/66 |
| 2005/0245127 | A1 * | 11/2005 | Nordin et al. ............ 439/540.1 |

FOREIGN PATENT DOCUMENTS

| | | |
|---|---|---|
| GB | 2375898 A | 11/2002 |
| WO | WO 99/26426 A1 | 5/1999 |
| WO | WO 2006/063023 A1 | 6/2006 |

OTHER PUBLICATIONS

International Search Report and Written Opinion of the International Searching Authority, corresponding to PCT/US2008/004325, mailed Aug. 25, 2008.
International Search Report corresponding to PCT/US1998/024447.

* cited by examiner

*Primary Examiner*—Vincent Q Nguyen
(74) *Attorney, Agent, or Firm*—Myers Bigel Sibley & Sajovec, P.A.

(57) ABSTRACT

A communications patching system includes first and second patch panels, each having a plurality of connector ports, and a patch cord that is configured to selectively interconnect a connector port in the first patch panel with a connector port in the second patch panel. Each patch panel includes a port identification circuit that is electrically coupled with the connector ports of the respective patch panel. The port identification circuit of each patch panel is configured to transmit a signal to a connector port of the other patch panel over a common mode transmission path of the patch cord. The first and second connector ports connected by the patch cord are identified from the signal path.

16 Claims, 4 Drawing Sheets

SYSTEMS AND METHODS OF IDENTIFYING PATCH CORD CONNECTIONS IN A COMMUNICATIONS PATCHING SYSTEM USING COMMON MODE TRANSMISSION

FIELD OF THE INVENTION

The present invention relates generally to communications systems and, more particularly, to communications patching systems.

BACKGROUND OF THE INVENTION

Many businesses have dedicated telecommunication systems that enable computers, telephones, facsimile machines and the like to communicate with each other through a private network and with remote locations via a communications service provider. In most buildings, the dedicated communications system is hard wired using telecommunication cables that contain conductive wires. In such hard wired systems, dedicated wires are coupled to individual service ports throughout the building. Conventionally, the wires from the dedicated service ports extend through the walls of the building to a communications closet or closets. The communications lines from the interface hub of a main frame computer or network and the telecommunication lines from external telecommunication service providers may also terminate within a communications closet. The communications line may comprise, for example, a communications cable or patch cord that contains four twisted pairs of conductors.

A patching system is typically used to interconnect the various telecommunication lines within a communications closet. In a communications patching system, the telecommunication lines are terminated within a communications closet in an organized manner. The organized terminations of the various lines are provided via the structure of the communications closet. A mounting frame having one or more racks is typically located in a communications closet. The communications lines terminate on the racks, as is explained below.

Referring to FIG. 1, a typical prior art rack 10 is shown. The rack 10 retains a plurality of patch panels 12 that are mounted to the rack 10. On each of the patch panels 12 are located port assemblies 14. The illustrated port assemblies 14 each contain six telecommunication connector ports 16 (e.g., RJ-45 ports), although other numbers of ports are possible (e.g., one, four, or eight ports per port assembly, etc.). Other types of patch panels are known, including patch panels with optical fiber ports (e.g., SC, ST, and FC ports) and copper wire ports.

Each telecommunication connector port 16 may be hard wired to a respective one of the communications lines. Accordingly, each communications line terminates on a patch panel 12 in an organized manner. In small patch systems, communications lines may terminate on the patch panels of the same rack. In larger patch systems, multiple racks may be used. Interconnections between the various communications lines are made using patch cords 20. Both ends of each patch cord 20 are terminated with connectors 22, such as, for example, an RJ-45 or RJ-11 connector. One end of a patch cord 20 is connected to a connector port 16 of a first communications line terminating at a first patch panel and the opposite end of the patch cord 20 is connected to a connector port 16 of a second communications line terminated at a second patch panel. By selectively connecting the various lines with patch cords 20, any combination of communications lines can be interconnected.

In many businesses, employees are assigned their own computer network access number exchange so that the employee can interface with a main frame computer or computer network. When an employee changes office locations, it may not be desirable to provide that employee with new exchange numbers. Rather, to preserve consistency in communications, it may be preferred that the exchanges of the telecommunication connection ports in the employee's old office be transferred to the communications ports in the employee's new office. To accomplish this task, patch cords in a telecommunication closet are rearranged so that the employee's old exchanges are now received in his/her new office.

As employees move and/or change positions, and/or as new lines are added and subtracted, the patch cords in a typical communications closet are rearranged quite often. The interconnections of the various patch cords in a communications closet are often logged in either a paper or computer based log. However, technicians may neglect to update the log each and every time a change is made. Thus, the log may become less than 100% accurate and a technician may not have a way of reading where each of the patch cords begins and ends. Accordingly, when a technician needs to change a patch cord, it may be necessary for the technician to manually trace that patch cord between two connector ports. To perform a manual trace, the technician locates one end of a patch-cord and then manually follows the patch cord until he/she finds the opposite end of that patch cord. Once the two ends of the patch cord are located, the patch cord can be positively identified.

It may take a significant amount of time for a technician to manually trace a particular patch cord, particularly within a collection of other patch cords. Furthermore, manual tracing may not be completely accurate and technicians may accidentally go from one patch cord to another during a manual trace. Such errors may result in misconnected telecommunication lines which must be later identified and corrected. Also, it may be difficult to identify the correct port to which a particular patch cord end should be connected or disconnected. Thus, ensuring that the proper connections are made can be very time-consuming, and the process is prone to errors in both the making of connections and in keeping records of the connections.

One existing method of detecting the connector ports that a patch cord is connected to utilizes a mechanical switch in each connector port of a patch panel. Each mechanical switch is configured to detect insertion and removal of a patch cord connector within and from a respective connector port. For example, when a patch cord connector is inserted within a connector port of a patch panel, the mechanical switch in the connector port is closed and a signal is generated. It is assumed that when two consecutive connections are made between two different patch panels, a connection exists between the connector ports via the patch cord. The advantage of this method is that special patch cords are not required. Unfortunately, however, this method cannot confirm that there is an actual connection between two connector ports and a patch cord. For example, two separate patch cords may have connectors that were inserted within respective connector ports of two patch panels sequentially in time. The conventional method would assume that the two connector ports were connected by the same patch cord, which would be erroneous. Accordingly, a need exists for accurately and quickly detecting and identifying patch cord connections in a communications system.

SUMMARY OF THE INVENTION

In view of the above discussion, a communications patching system, according to some embodiments of the present invention, includes first and second patch panels, each having a plurality of connector ports, and a patch cord that is configured to selectively interconnect a connector port in the first patch panel with a connector port in the second patch panel. Each patch panel includes a port identification circuit that is electrically coupled with the connector ports of the respective patch panel. The port identification circuit of each patch panel is configured to transmit a signal (e.g., an AC signal, a DC signal, etc.) to a connector port of the other patch panel over a common mode transmission path of a patch cord, and to acknowledge receipt of a signal from a port identification circuit of the other patch panel over the common mode transmission path. The first and second connector ports connected by the patch cord are identified from the signal path. According to some embodiments of the present invention, a database is provided that logs patch cord interconnections with connector ports of the first and second patch panels.

Embodiments of the present invention are advantageous because the port identification circuit of each patch panel is configured to transmit and receive a signal over the common mode transmission path of a patch cord simultaneously with data transmission over a differential mode transmission path of the patch cord.

According to some embodiments of the present invention, a method of identifying the physical location of patch cord connectors in a communications patching system, includes transmitting a signal from a first patch panel connector port to a second patch panel connector port over a common mode transmission path of a patch cord that interconnects the first and second patch panels; acknowledging receipt of the signal at the second patch panel connector port to the first patch panel connector port over the common mode transmission path; and identifying the first and second patch panel connector ports from the signal path. The physical location of the patch cord connectors can be logged within a database.

Embodiments of the present invention may be utilized with any type of patch panel and corresponding patch cords including, but not limited to, patch panels with RJ-45 and RJ-11 ports and patch panels with copper wire ports.

DETAILED DESCRIPTION OF EMBODIMENTS OF THE INVENTION

Figure 1:
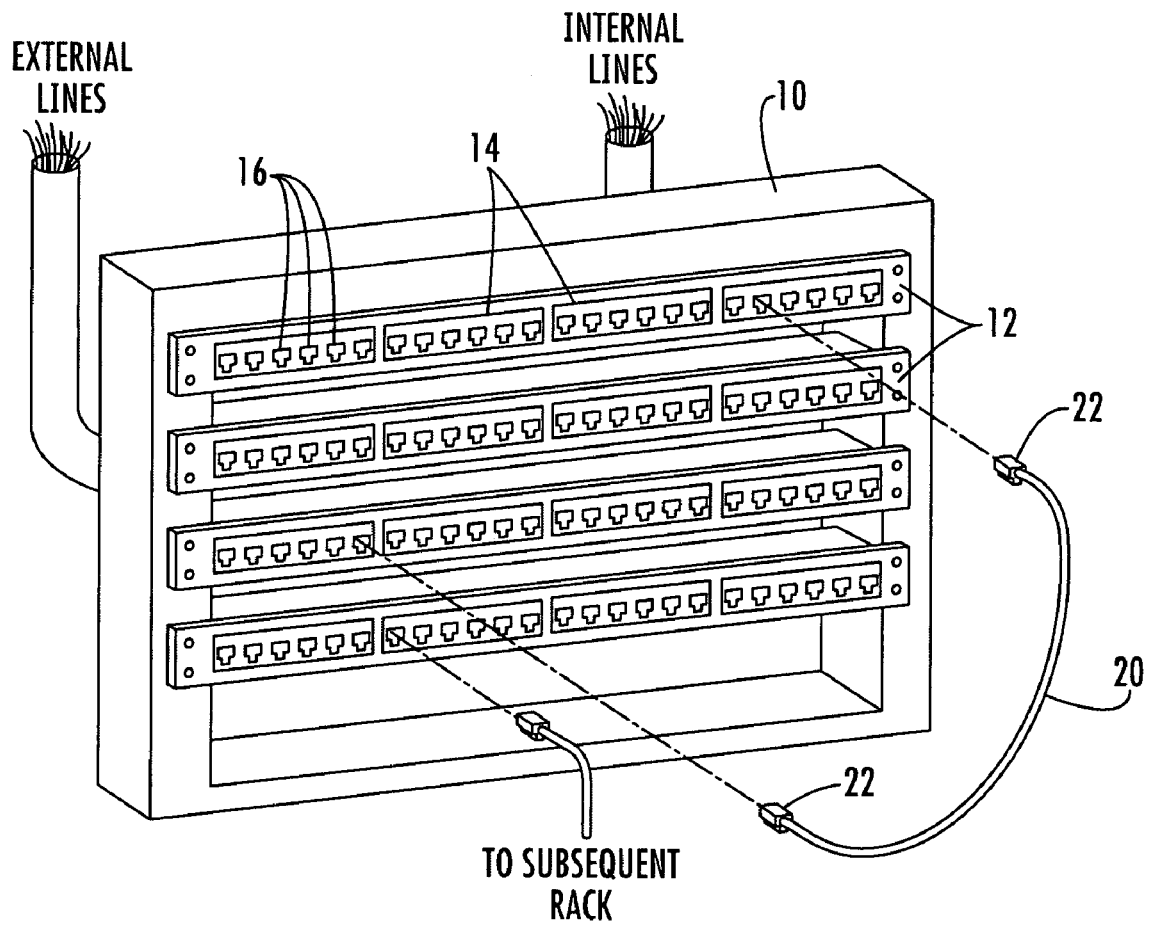
FIG. 1 is a perspective view of a typical prior art communications rack assembly containing multiple patch panels with connector ports that are selectively interconnected by patch cords.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present.

It will be understood that, although the terms "first", "second", etc. may be used herein to describe various elements, components, patch panels, etc., these elements, components, patch panels etc. should not be limited by these terms. These terms are only used to distinguish one element, component, patch panel etc. from another element, component, patch panel. Thus, a "first" element, component, patch panel discussed below could also be termed a "second" element, component, patch panel without departing from the teachings of the present invention. The sequence of operations (or steps) is not limited to the order presented in the claims or figures unless specifically indicated otherwise.

In conventional electrical communications systems, the information signals (e.g., video, audio, data) are typically transmitted over a pair of conductors (hereinafter a "differential pair" or simply a "pair") rather than a single conductor. The signals transmitted on each conductor of the differential pair have equal magnitudes, but opposite phases, and the information signal is embedded as the voltage difference between the signals carried on the two conductors. This transmission technique is generally referred to as "balanced" transmission. When signals are transmitted over a conductor such as a copper wire in a communications cable, electrical noise from external sources may be picked up by the conductor, degrading the quality of the signal carried by the conductor. With balanced transmission techniques, each conductor in a differential pair often may pick up approximately the same amount of noise from these external sources. Because approximately an equal amount of noise is added to the signals carried by both conductors of the differential pair, the information signal is typically not disturbed, as the information signal is extracted by taking the difference of the signals carried on the two conductors of the differential pair; thus the noise signal may be cancelled out by the subtraction process.

Pursuant to embodiments of the present invention, communications patching systems are provided which quickly and automatically identify the patch panel ports to which each patch cord are connected. In particular, pursuant to embodiments of the present invention, patching systems are provided that include port identification circuits that transmit and/or receive signals over a common mode transmission path in order to identify port pairs that are connected by a patch cord. As a common mode signal transmitted over a differential pair adds the same amount of signal energy to each wire of the differential pair, the common mode signal subtracts out of, and hence does not degrade, the differential information signal. Accordingly, by transmitting a common mode signal over the differential pairs that are already part of conventional patching systems it is possible to automatically and accurately keep track of the port connections in a patching system.

Figure 2:
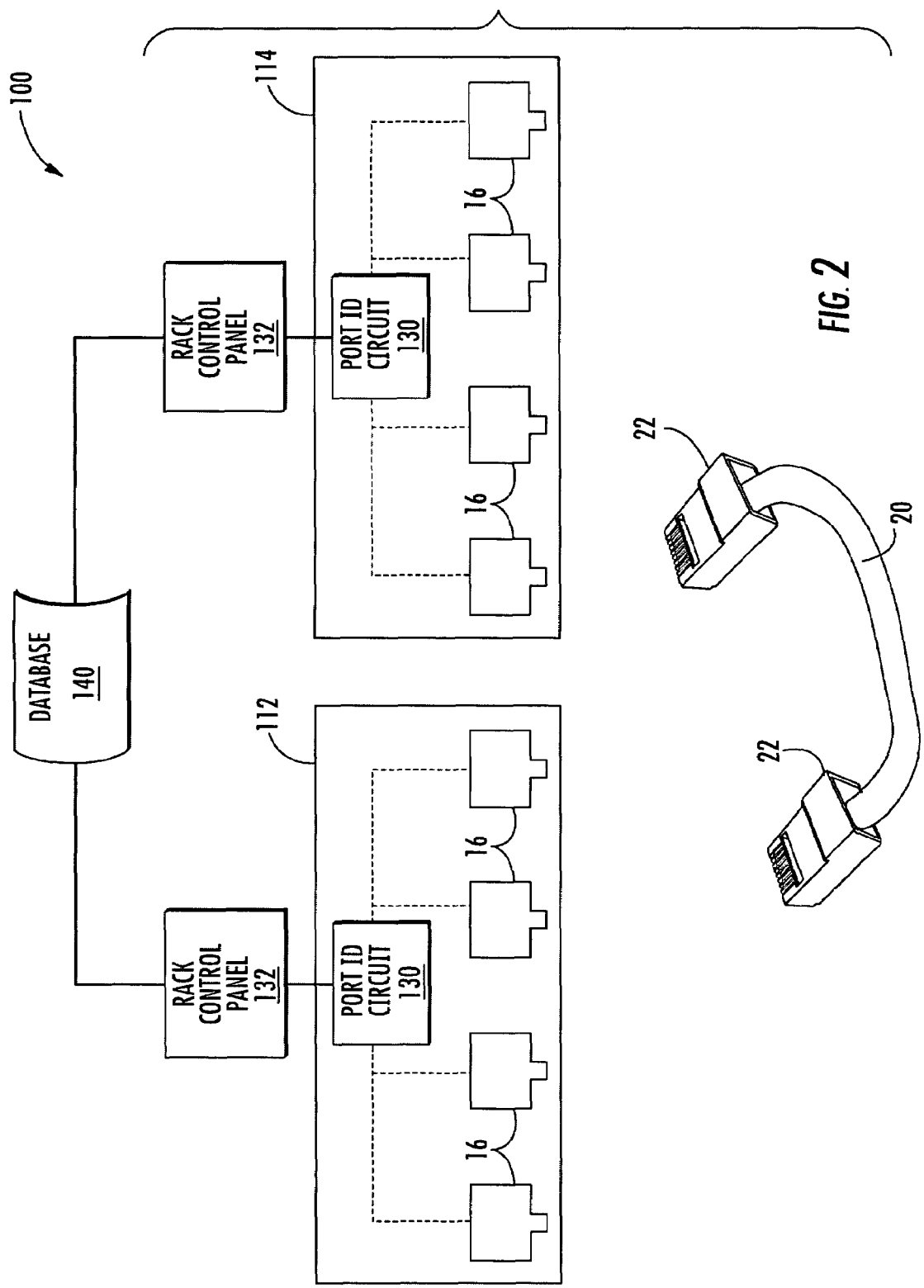
FIG. 2 illustrates a communications patching system configured to identify the physical location of patch cord connectors, according to some embodiments of the present invention.

Referring now to FIG. 2, a communications patching system 100, according to embodiments of the present invention, is illustrated and includes first and second patch panels 112, 114, each having multiple connector ports (e.g., RJ-45 ports, RJ-11 ports, etc.) 16, one or more patch cords 20, one or more port identification circuits 130 electrically coupled with the connector ports 16, rack control panels 132, and a database 140 that monitors and logs patch cord interconnections with the connector ports 16. Patch cord 20 is configured to selectively interconnect a connector port 16 in the first patch panel 112 with a connector port 16 in the second patch panel 114. The patch cord 20 includes opposite ends and a respective connector 22 secured to each end, as illustrated. Each connector 22 is configured to be removably secured within a connector port 16.

The port identification circuit 130 of each patch panel 112, 114 is configured to transmit a signal (e.g., an AC signal, a DC signal, etc.) through a connector port 16 and to the port identification circuit 130 of the other patch panel 112, 114 over a common mode transmission path of the patch cord 20. Each port identification circuit 130 may also be configured to acknowledge receipt of a signal from a connector port 16 of the other patch panel 112, 114 over the common mode transmission path. The physical location of the patch cord connectors 22 can then be identified (i.e., the connector ports 16 in the first and second patch panels 112, 114 connected by the patch cord 20 are identified) from the common mode transmission path. Accordingly, the connector ports 16 in two patch panels 112, 114 connected by the patch cord 20 can be positively identified.

Various types of communication mechanisms can be utilized without limitation. Exemplary communication mechanisms include, for example, where the port identification circuit 130 connects the common mode transmission path of the two pairs together for a time period t, representing a digital zero. A digital one would be an open circuit between the common mode transmission path of the two pairs. At other times the port identification circuit 130 would monitor the common mode connection of the two wire pairs for a digital zero. To avoid overlapping zeros from the two ends of a patch cord 20, each port identification circuit 130 would transmit the digital zero at random intervals. If the port identification circuit 130 receives a digital zero of time period t then it will return a digital zero of time period 3t, as a method of acknowledgement to the other end. If the port identification circuit 130 receives a digital zero whose time period is 3t then it knows that a patch cord 20 is connected to another port. One method to uniquely identify the port connection is to only allow one port identification circuit 130 to return an acknowledgement at a time. Once the connection has been established, one method to monitor the patch cord connection is the port identification circuit 130 that received the acknowledgement would then maintain a digital zero. At the other end of the patch cord 20 the port identification circuit 130 would monitor this to determine when a patch cord 20 is removed.

Instead of continually sending a digital zero, an alternate method is to use a mechanical or electrical switch to identify when a patch cord 20 has been inserted or removed from a connector port 16 and at that time start or stop the port identification circuit 130. Also alternate methods of communication may include using AC signals which could be on and off or modulated.

A separate rack control panel 132 would reside in each rack, and includes a microprocessor to communicate to each connector panel (e.g., 112, 114, etc.) and the port identification circuit 130 via a shared serial bus connected to each connector panel. The number of connector panels controlled by a rack control panel 132 would include all connector panels that are attached to the rack. The illustrated patching system 100 also includes a database 140 that communicates with the rack control panel 132 on each rack. Each rack control panel 132 communicates to the database when a port 16 receives a digital zero or an acknowledgement, and when a patch cord 20 is disconnected. The physical location of the port 16 would be included in the communication. The database 140 notifies the rack control panel 132 when an acknowledgement can be sent by a port 16 and when a patch cord 20 has been disconnected from a port 16. The database 140 is configured to log patch cord interconnections with connector ports 16 of the first and second patch panels 112, 114. Database 140 may be any type of database and may include multiple databases. Database 140 may be implemented by any of various known data storage technologies, without limitation.

As is known by those of skill in the art, a database is a collection of data that is organized in "tables." A database typically includes a database manager that facilitates accessing, managing, and updating data within the various tables of a database. Exemplary types of databases that can be used for logging the location of the patch cord connectors in a communications patching system, according to embodiments of the present invention, include, but are not limited to, relational databases, distributed databases (databases that are dispersed or replicated among different points in a network), and object-oriented databases. Relational, distributed, and object-oriented databases are well understood by those of skill in the art and need not be discussed further herein. Exemplary commercial databases that can be used to implement embodiments of the present invention include, but are not limited to, IBM's DB2® database, Microsoft's SQL server database, and other database products, such as those from Oracle, Sybase, and Computer Associates.

Figure 3:
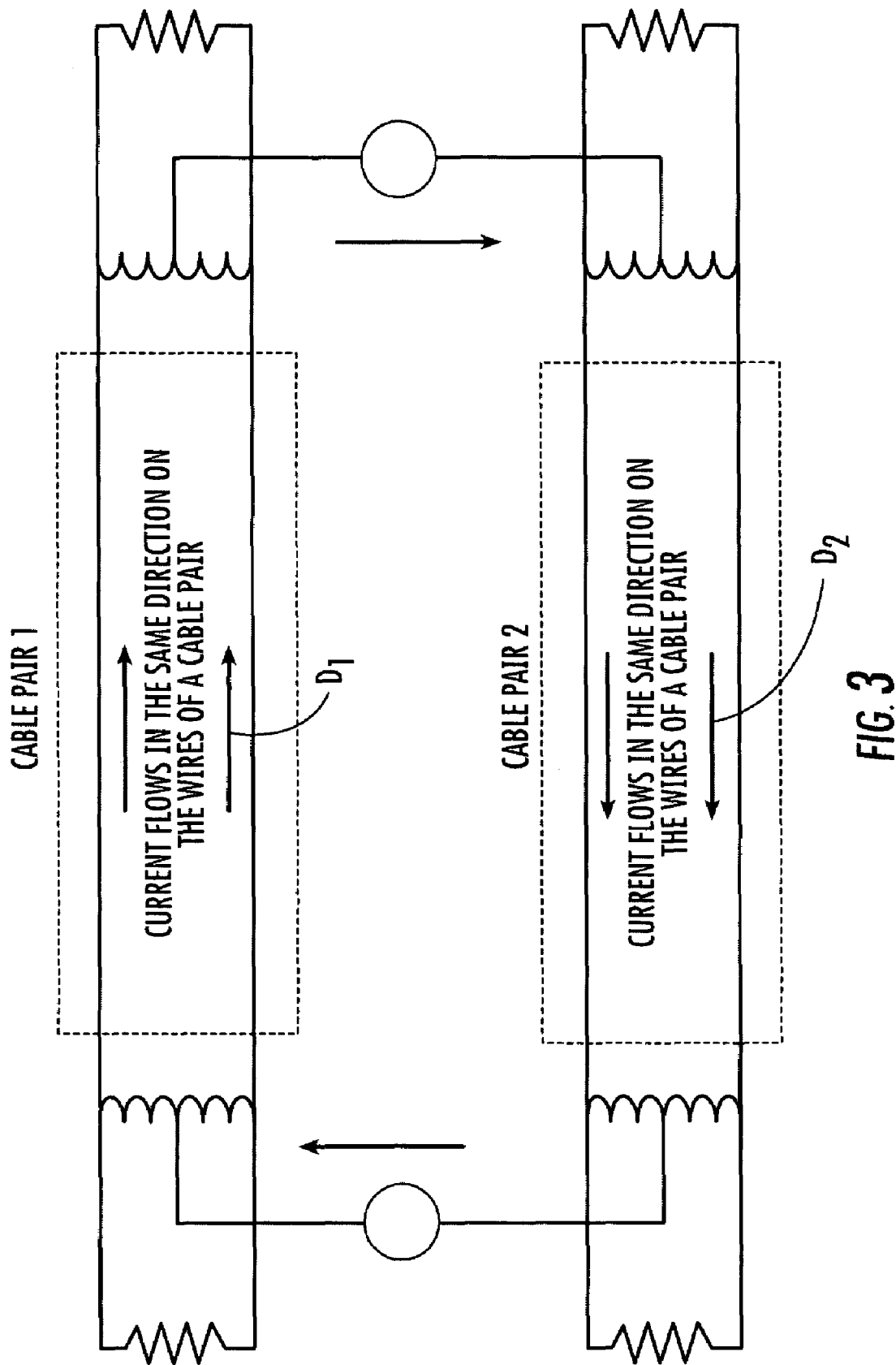
FIG. 3 is an electrical schematic view of common mode transmission over a patch cord.

Referring to FIG. 3, common mode transmission of a signal over a patch cord, according to some embodiments of the present invention, is illustrated. A common mode transmission sends the same signal across each conductor of a pair in the same direction. In the illustrated embodiment, a signal is transmitted over the wires of cable pair 1 in the direction $D_1$ and the signal returns over the wires of cable pair 2 in the direction $D_2$. In an Ethernet twisted pair, LAN data is transmitted between endpoints using differential mode transmission. In a well balanced system, differential mode and common mode transmission can coexist and not interfere with each other.

Figure 4:
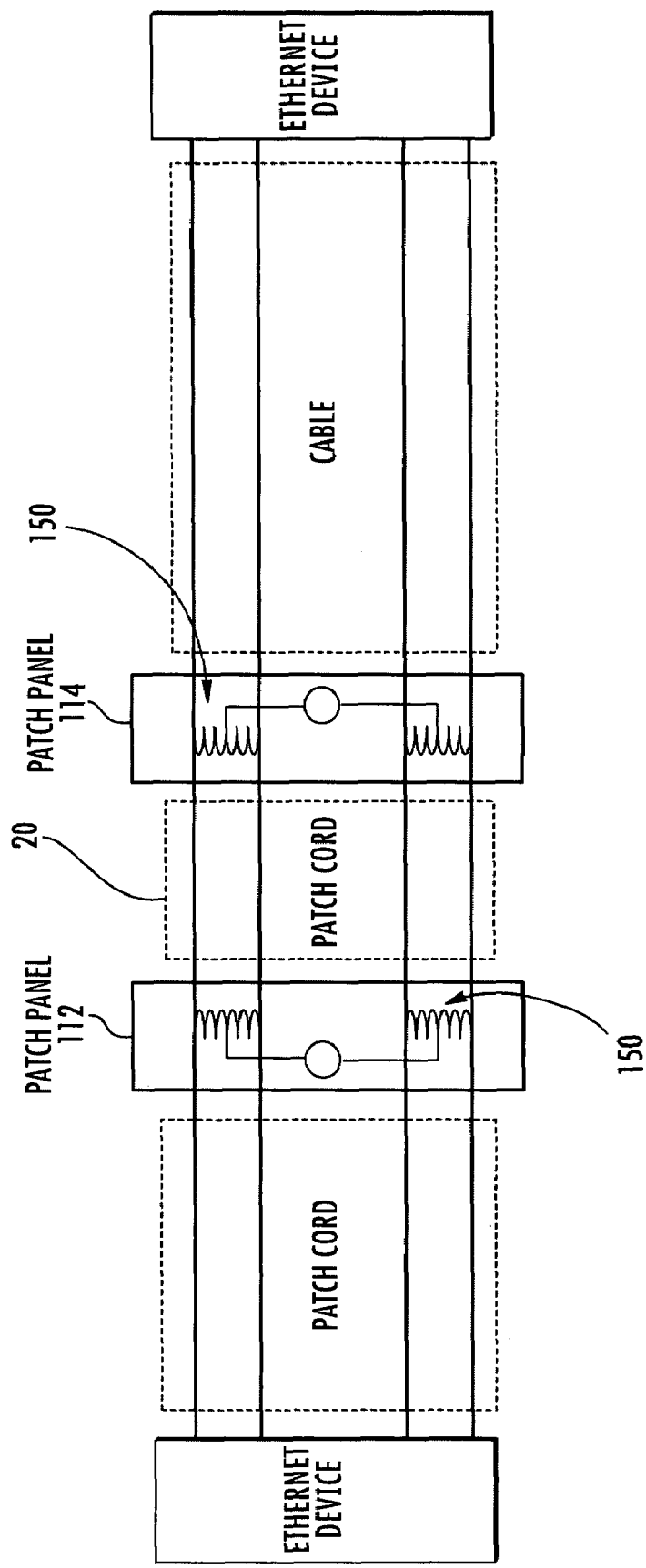
FIG. 4 illustrates a communications patching system configured to identify the physical location of patch cord connectors, according to some embodiments of the present invention, wherein different pairs of a common mode transmission path use a center tapped inductor with two ends of the inductor connected to two wires of a pair.

Referring to FIG. 4, the identification of the physical location of patch cord connectors in a communications patching system 100 is illustrated. To determine the actual connection of a patch cord 20, a signal is transmitted over the common mode transmission path of the patch cord 20 between the endpoint connections (i.e., connector ports 16) in the patch panels 112, 114. A transmitted signal may be a DC signal or an AC signal. Connection to the different pairs of the common mode transmission path could use a center tapped inductor 150 with two ends of the inductor 150 connected to the two wires of a pair, where one center tap of one pair is the positive and the center tap of the second pair is the negative of the common mode transmitting and receiving signal. Other methods of sending and receiving a common mode signal could include a balanced set of passive components such as resistors and/or capacitors attached to each wire and connected together to form a center tapped component. A balanced set of active devises such as matched transistors could also be used.

Often at an Ethernet device, the common mode of each wire pair may be terminated. In cases where this termination may cause a problem, each wire of the pairs could be AC coupled between the two center tapped inductors and the Ethernet device.

The inductor 150 and associated electronics can reside on the connector board of each of the patch panels 112, 114, or a separate board attached to the connector board. The port identification circuit 130 could consist of a micro controller or random logic. The circuit would generate and receive the signal that is transmitted over the common mode connection of the patch cord. In addition the port identification circuit 130 will communicate to the rack control panel 132 on any changes to the connector ports 16 or a control button operation and receive authorization to send an acknowledgement or release a port 16 when the patch cord 20 has been disconnected. The port identification circuit 130 could be duplicated for each connector port 16 or be shared across many ports 16 through a multiport multiplexer.

To determine the physical location of each port 16 the rack control panel 132 would first determine the physical location of each connector panel (e.g., 112, 114, etc.). One method is when the rack is first powered up, the user would press a control button on each connector panel starting at the top of the rack working down to the bottom connector panel. This would be tracked by the rack control panel 132, converted to a physical address, and communicated back to the port identification circuit 130 on each connector panel to be retained as the panel address. This is combined with the port address on each connector panel which is fixed by the physical location on the actual panel. The port identification circuit 130 would then convey the panel and port address to the rack control panel 132 with any communication. The identification of each rack control panel 132 could be set as a selectable unique address. The rack control panel 132 would convey this address, along with the panel and port address to the database along with any information on the connector port.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of identifying the physical location of first and second patch cord connectors of a patch cord in a communications patching system, wherein the first patch cord connector is inserted within a first patch panel connector port and the second patch cord connector is inserted within a second patch panel connector port, the method comprising:
   transmitting a signal from the first patch panel connector port to the second patch panel connector port over a common mode transmission path of the patch cord simultaneously with data transmission over a differential mode transmission path of the patch cord; and
   identifying the first and second patch panel connector ports based at least in part on the transmitted signal.

2. The method of claim 1, wherein the signal comprises a DC signal.

3. The method of claim 1, wherein the signal comprises an AC signal.

4. The method of claim 1, further comprising logging the location of the patch cord connectors in a database.

5. A method of identifying the physical location of patch cord connectors in a communications patching system, wherein the communications patching system includes a first patch panel having a plurality of connector ports and a first port identification circuit electrically coupled with the first patch panel connector ports, a second patch panel having a plurality of connector ports and a second port identification circuit electrically coupled with the second patch panel connector ports, and a patch cord having one connector inserted within a connector port in the first patch panel and an opposite connector inserted within a connector port in the second patch panel, the method comprising:
   transmitting, via the first port identification circuit, a signal from the first patch panel connector port to the second patch panel connector port over a common mode transmission path of the patch cord, wherein transmitting the signal over the common mode transmission path of the patch cord is performed simultaneously with data transmission over a differential mode transmission path of the patch cord; and
   identifying the first and second patch panel connector ports from the signal path.

6. The method of claim 5, wherein the signal comprises a DC signal.

7. The method of claim 5, wherein the signal comprises an AC signal.

8. The method of claim 5, further comprising logging the location of the patch cord connectors.

9. A communications patching system, comprising:
   a first patch panel comprising a plurality of connector ports and a port identification circuit electrically coupled with the first patch panel connector ports;
   a second patch panel comprising a plurality of connector ports and a port identification circuit electrically coupled with the second patch panel connector ports; and
   a patch cord configured to selectively interconnect a connector port in the first patch panel with a connector port in the second patch panel;
   wherein the port identification circuit of each patch panel is configured to transmit a signal to a connector port of the other patch panel over a common mode transmission path of the patch cord, wherein the first and second connector ports connected by the patch cord are identified from the signal path, and wherein the port identification circuit of each patch panel is configured to transmit a signal over the common mode transmission path of the patch cord simultaneously with data transmission over a differential mode transmission path of the patch cord.

10. The communications patching system of claim 9, further comprising a database that logs patch cord interconnections with connector ports of the first and second patch panels.

11. The communications patching system of claim 9, wherein the port identification circuit of each patch panel is configured to transmit a DC signal over the common mode transmission path of a patch cord.

12. The communications patching system of claim 9, wherein the port identification circuit of each patch panel is configured to transmit an AC signal over the common mode transmission path of a patch cord.

13. A method of transmitting signals through a communications patching system that comprises one or more patch panels and at least one patch cord, the method comprising:

transmitting a differential signal over a pair of conductive paths in the communications patching system;

simultaneously transmitting a first common mode signal over the pair of conductive paths; and using the common mode signal to identify patching system connector ports.

14. The method of claim 13, wherein the pair of conductive paths comprise one of a plurality of differential pairs in the patch cord.

15. The method of claim 14, wherein the common mode signal is used to identify the communications ports on the one or more patch panels to which the patch cord is connected.

16. The method of claim 15, wherein the first common mode signal is generated by a port identification circuit of the patching system.

* * * * *